United States Patent
Hausammann et al.

[19]

[11] Patent Number: 5,899,153

[45] Date of Patent: May 4, 1999

[54] PROCESS FOR THE ORGANIZATION OF THE MEMORY OF AN ELECTRONIC SEWING MACHINE, AND SEWING MACHINE

[75] Inventors: Erich Hausammann, Ermatingen; Hanspeter Vogel, Steckborn, both of Switzerland

[73] Assignee: Fritz Gegauf AG Bernina-Nahmaschinenfabrik, Steckborn, Switzerland

[21] Appl. No.: 08/924,879

[22] Filed: Sep. 5, 1997

Related U.S. Application Data

[63] Continuation of application No. 08/673,752, Jun. 27, 1996, abandoned.

[30] Foreign Application Priority Data

Jul. 14, 1995 [CH] Switzerland ............................ 02087/95

[51] Int. Cl.$^6$ ............................ D05B 19/08; D05B 21/00
[52] U.S. Cl. ................ 112/102.5; 112/457; 112/470.04; 364/470.09
[58] Field of Search ..................... 112/457, 458, 112/456, 453, 102.5, 470.04, 470.06, 475.19, 103; 364/470.07, 470.08, 470.09

[56] References Cited

U.S. PATENT DOCUMENTS

| | | |
|---|---|---|
| 4,622,907 | 11/1986 | Kimura ............................... 112/103 X |
| 4,672,903 | 6/1987 | Kato ........................................ 112/457 |
| 5,218,916 | 6/1993 | Kurono et al. . |
| 5,282,142 | 1/1994 | Asano . |
| 5,319,565 | 6/1994 | Hausammann ...................... 112/458 X |
| 5,319,566 | 6/1994 | Kongho et al. ...................... 112/457 X |
| 5,383,413 | 1/1995 | Hayashi .............................. 112/103 X |
| 5,558,032 | 9/1996 | Muto et al. .................... 112/470.04 X |
| 5,662,055 | 9/1997 | Harwig et al. ....................... 112/102.5 |

FOREIGN PATENT DOCUMENTS

| | | |
|---|---|---|
| 0 134 046 | 3/1985 | European Pat. Off. . |
| 0 276 629 | 8/1988 | European Pat. Off. . |
| 0 475 885 | 3/1992 | European Pat. Off. . |
| 0 501 092 | 9/1992 | European Pat. Off. . |
| 0 518 816 | 12/1992 | European Pat. Off. . |
| 29 49 207 | 6/1980 | Germany . |
| 41 35 472 | 5/1993 | Germany . |

*Primary Examiner*—Peter Nerbun
*Attorney, Agent, or Firm*—Foley & Lardner

[57] ABSTRACT

An electronic sewing machine is equipped with interfaces (6, 7, 8, 9) by which additional stitch or stitch pattern data can be introduced into a changeable memory of the sewing machine. This conception makes possible that the user of the sewing machine is able to store afterwards, i.e. after having acquired the sewing machine, a selection of preferred stitch types or stitch patterns according to individual wishes, and then to fetch such data without need for any external auxiliary means.

17 Claims, 5 Drawing Sheets

PROCESS FOR THE ORGANIZATION OF THE MEMORY OF AN ELECTRONIC SEWING MACHINE, AND SEWING MACHINE

This application is a continuation of application Ser. No. 08/673,752, filed Jun. 27, 1996, now abandoned.

BACKGROUND OF THE INVENTION

(1) Field of the Invention

The present invention is related to a process for the organization of the data memory of an electronic sewing machine, said memory containing storage locations for data of stitches and stitch patterns The programming memories of known electronic sewing machines are completely occupied by data for sewing predetermined stitch types or stitch patterns, i.e. the storage capacity is used in total to provide the user with as many as possible pre-established or at least also changeable data for the execution of simple and sophisticated sewing work.

(2) Description of the Prior Art

It has already become known to complete data stored in the sewing machine by additional data which are contained on a data carrier capable of being read by the sewing machine (see EP-A-0,276,629). These data carriers, however, into contain well defined, predetermined data and provide the user with a correspondingly limited number only of additional stitch types or stitch patterns that are perhaps only used to a little extent and are thus not desired.

It has further become known to prepare data for the control of a sewing or stitching machine in a data processing unit and to enter them through an interface of the sewing or stitching machine (U.S. Pat. No 5,218,916 and U.S. Pat. No. 5,282,142). However, this concerns rather industrial machines without fixedly stored stitch or stitch pattern data in a memory of the machine. Such an installation cannot be used as a household sewing machine where, under ideal conditions, all necessary data are stored in the machine itself and can be selected without additional devices.

Thus, the main and most important object of this invention is to provide a method for the organization of the memory of an electronic sewing machine whose properties are closely adapted to the needs, wishes and preferences of the user. There is a further object of the invention to provide a new and useful sewing machine which is obtained by the process that is the first object of the invention

SUMMARY OF THE INVENTION

The objects described above and still others are met by the process of the invention comprising the storage of predetermined data for stitches and/or stitch patterns during the manufacturing of the sewing machine and the storage of additional data afterwards, i.e. after the acquisition of the sewing machine by the user, according to individual needs, display possibilities for all stitch types and stitch patterns being provided.

The sewing machine according to the invention comprises a microprocessor (CPU) and memories (ROM, RAM) from which stitch and stitch pattern data can be fetched for controlling the sewing elements, and at least one interface allowing stitch and stitch pattern data to be stored into the memory. According to the invention, the memory of the machine further contains storage locations (RAM) for a plurality of stitch or stitch pattern data supplied via said interface. Display locations (10P, 14) and selection means (12) are provided and allocated to said storage locations.

Thus, the data for commonly used stitch types such as straight stitches and zigzag stitch as well as for commonly used stitch patterns are fixedly stored in the memory of the sewing machine by the manufacturer. However, a number of memory locations are left free or at least changeable for allowing the subsequent storage of additional data through one or more interfaces of the sewing machine, or to replace already stored data by such that are more closely adapted to the requirements or preferences of the user. The desired additional data are taken from a complete data collection supplied by the machine manufacturer or another supplier, then appropriately arranged, preferably in a data processing unit, and finally transferred into the memory of the sewing machine. Depending on the particular control field of the sewing machine, the patterns and stitch types corresponding to the data to be stored may be simultaneously displayed, or, alternatively, this display may be done on a data processing unit such as a personal computer (PC). However, it is also possible to print a stitch pattern chart which can be fastened to the sewing machine and allows an easy selection of the desired stitch patterns. Furthermore, it is possible to change or modify from time to time the individual stitch patterns that are stored and to adapt them to personal requirements or the evolution of the fashion. Once the storage of the data or, respectively, the replacement of former data is finished, the sewing machine is completely autonomous and can be operated in the same manner as any conventional household sewing machine in which all available data are stored.

DETAILED DESCRIPTION OF THE INVENTION

The following description of special embodiments of the present invention is given by way of illustration only and for a better understanding thereof. This description will not limit the invention in any way. The attached drawings are part of the detailed description of embodiments, and reference will be made to them

Figure 1:
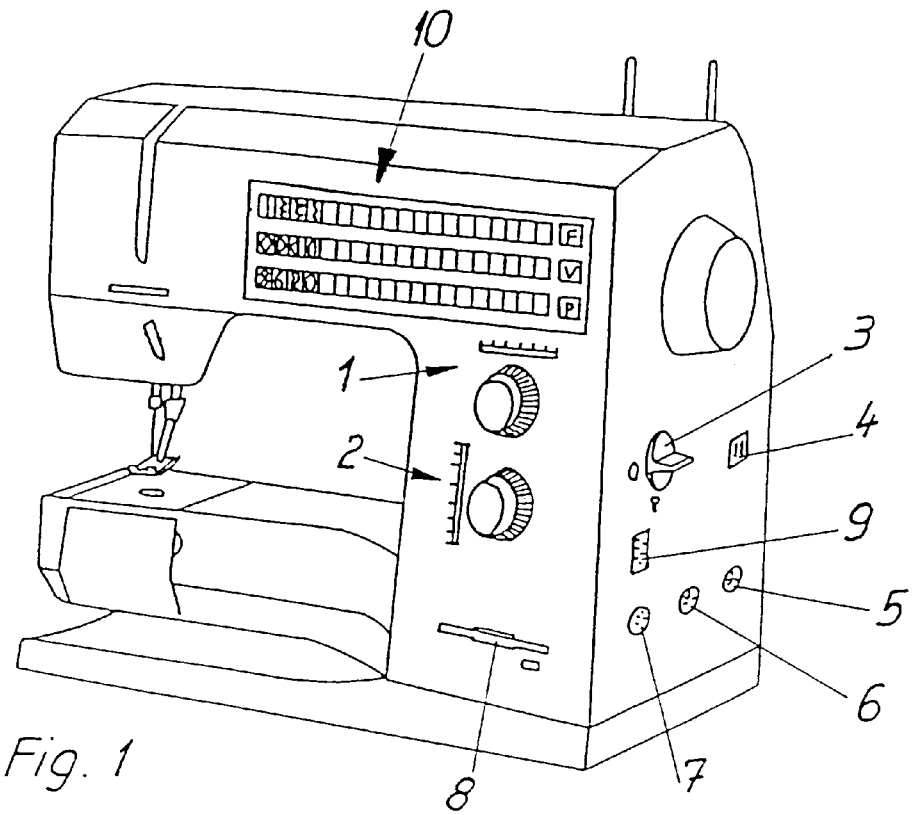
FIG. 1 shows an electronic sewing machine comprising a graphical display screen and several data interfaces.

The sewing machine according to FIG. 1 comprises the usual stitch elements (part of which is not shown), control elements and other equipment parts, among them the usual elements and displays 1 and 2 for individually adjusting the stitch width and length, a main switch 3, a main connecting socket 4 and a connector 5 for a foot control lever or switch. So far, the equipment of the sewing machine corresponds to that of usual electronic or electric sewing machines.

Furthermore, the sewing machine of the invention comprises a PC connector 6, a socket 7 for the connection of a scanner, a mouse, a trackball or similar, and a floppy or CD drive of which FIG. 1 shows the opening 8 for the insertion of a floppy disk or a CD, respectively. Further, a socket 9 for a data key is provided. The sewing machine further comprises a display screen 10 showing three rows of fields for displaying stitch types and stitch patterns. In the uppermost row F, fixedly programmed stitch types and often used stitch patterns are shown, the center row V displays variable stitch patterns whose data are stored in the machine or have been afterwards introduced from data carriers bought by afterthought, and the undermost row P shows personal, individually selected stitch patterns in random arrangement. The selection of the desired stitch types and stitch patterns may be effected in a usual way by means of a cursor or directly from a foil keyboard, and the selected pattern is displayed in inverse representation Other selection and display modes are possible and belong to this invention.

Through the connecting points 6, 7 and 9 or through the drive 8, the stitch types and stitch patterns that are not fixedly programmed can be stored or changed according to personal wishes. The sewing machine is thus programmed by the manufacturer only with fixedly installed data for certain stitch types and stitch patterns and sold with this configuration, and the buyer has afterwards the possibility of storing or having stored additional data for certain stitch types and stitch patterns according to the buyer's own wishes and imaginations. This storing can preferably be made by the machine dealer who keeps available a correspondingly large selection of available data on appropriate data carriers from which he can select and store the desired data. It will also be possible to fetch these data from a database of the manufacturer or another provider and to store them into the sewing machine.

Figure 5:
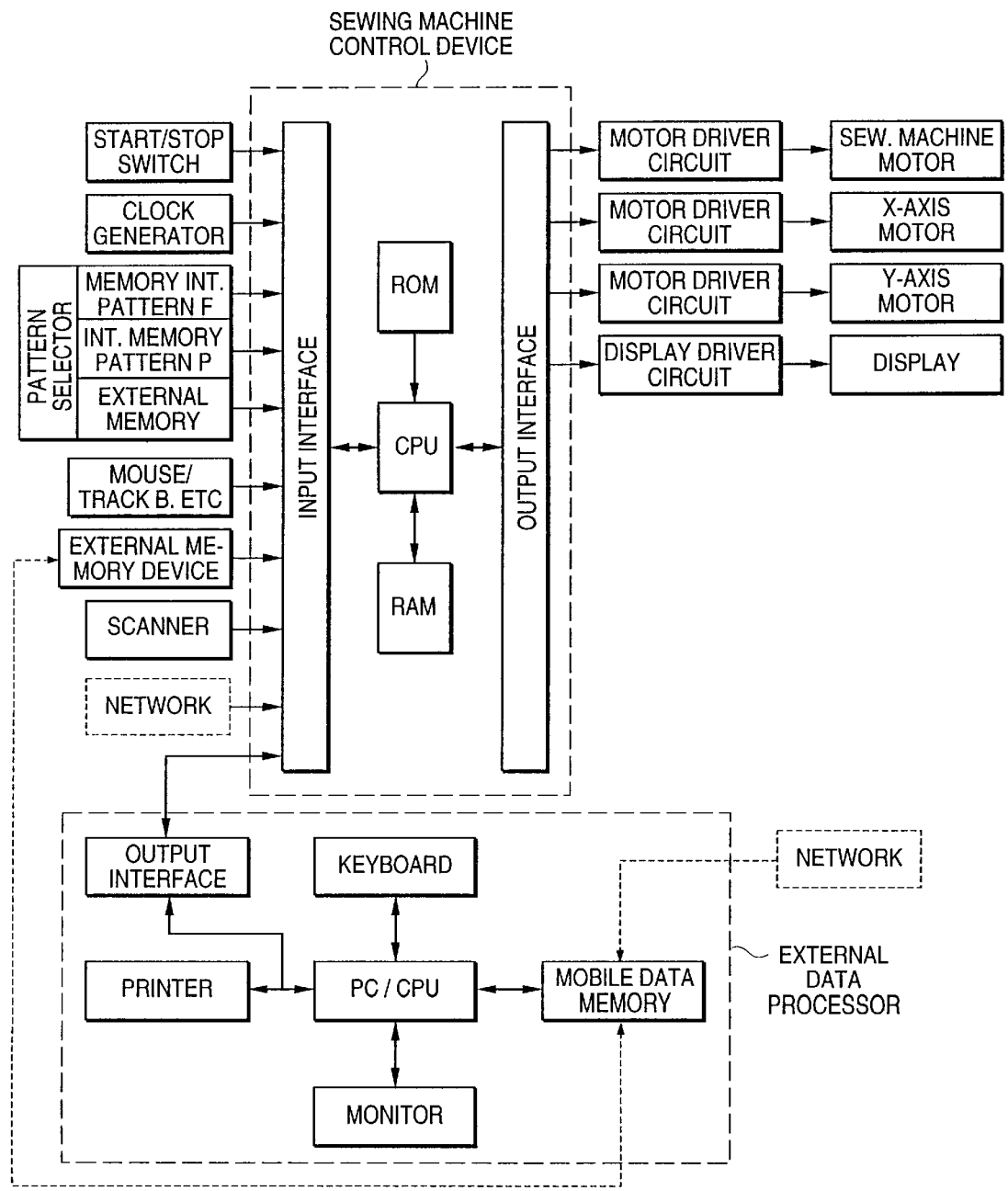
FIG. 5 represents a block diagram of the hardware configuration of the sewing machine according to FIG. 1 and of the associated external data processing unit.

In any case, the compiling and storage of the data is preferably effected in an external data processing unit, for example an appropriate PC equipped with a suitable program. FIG. 5 shows an embodiment of the components of the electronic control unit of the sewing machine and, on the other hand, of an associated external data processing unit. The functions of the individual installation elements and of the whole installation can be understood from the legends in FIG. 5. It should however be added that the sewing machine comprises a fixed memory ROM in which the data of the fixedly stored stitch types and stitch patterns are collected, and a floating memory RAM for storing the exchangeable and variable stitch type and stitch pattern data in the free or movable storage locations.

As it can further be seen in FIG. 5, an external memory, e.g. the above mentioned data key that is connected to the socket 9, may be provided. The external storage unit and the mobile data memory of the data processing unit may constitute connection possibilities for CD-ROMs or PC floppy disks. The network connection which is represented in FIG. 5 in dashed lines and which is therefore an optional element, indicates that the introduction of data into a sewing machine having a sufficiently strong microprocessor may directly be effected from a network. Finally, it is also possible to connect an image scanner which allows to generate stitch pattern data from an existing image and to store them into the sewing machine.

As it has already been mentioned above, the compiling and storage of the desired data is usually made by an associated external data processing unit, for example the shown PC having a display, a keyboard and a printer assigned thereto. As it has been indicated, the stitch and the stitch pattern data may be fetched from a mobile data memory or directly from a network, processed, compiled and then stored in the floating RAM of the sewing machine through the output interface. As it has also been mentioned before, the input interface and the central processing unit CPU of the sewing machine may be constructed in such a manner that stitch and stitch pattern data can directly be fetched from a database over a corresponding network. However, the possession of a PC is nowadays so widespread that in most cases the acquisition of a corresponding program for the already existing PC will be sufficient.

Figure 2:
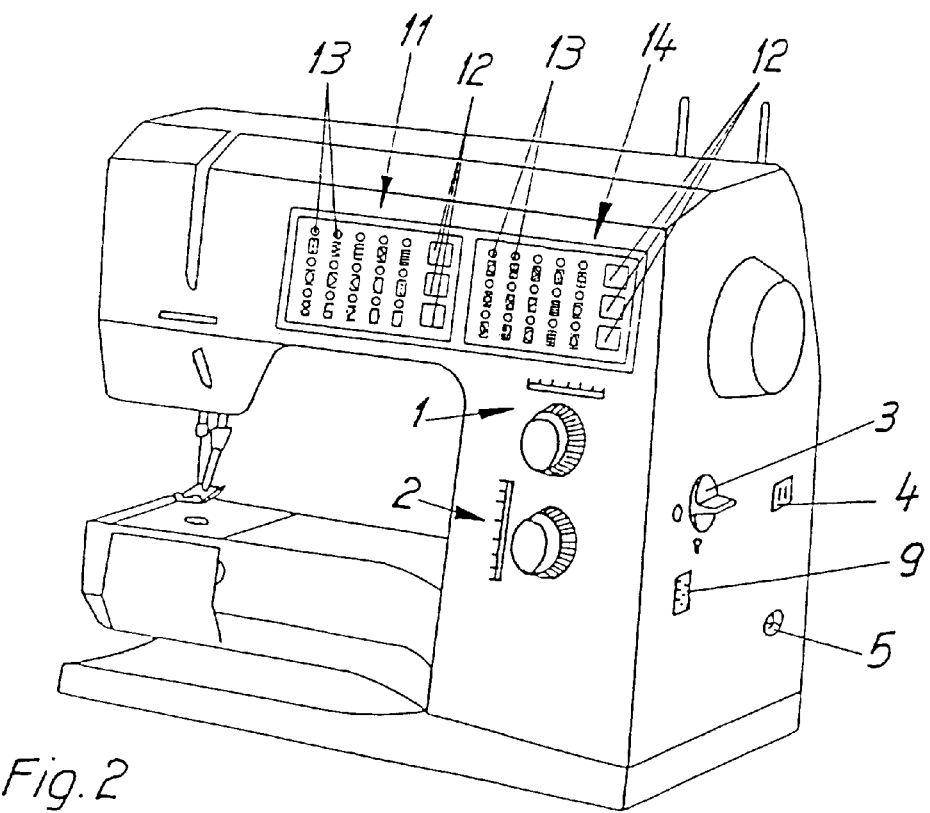
FIG. 2 represents a simpler electronic sewing machine having a sequential stitch pattern selection, a diode display and a data interface for connection with a PC.
Figure 3:
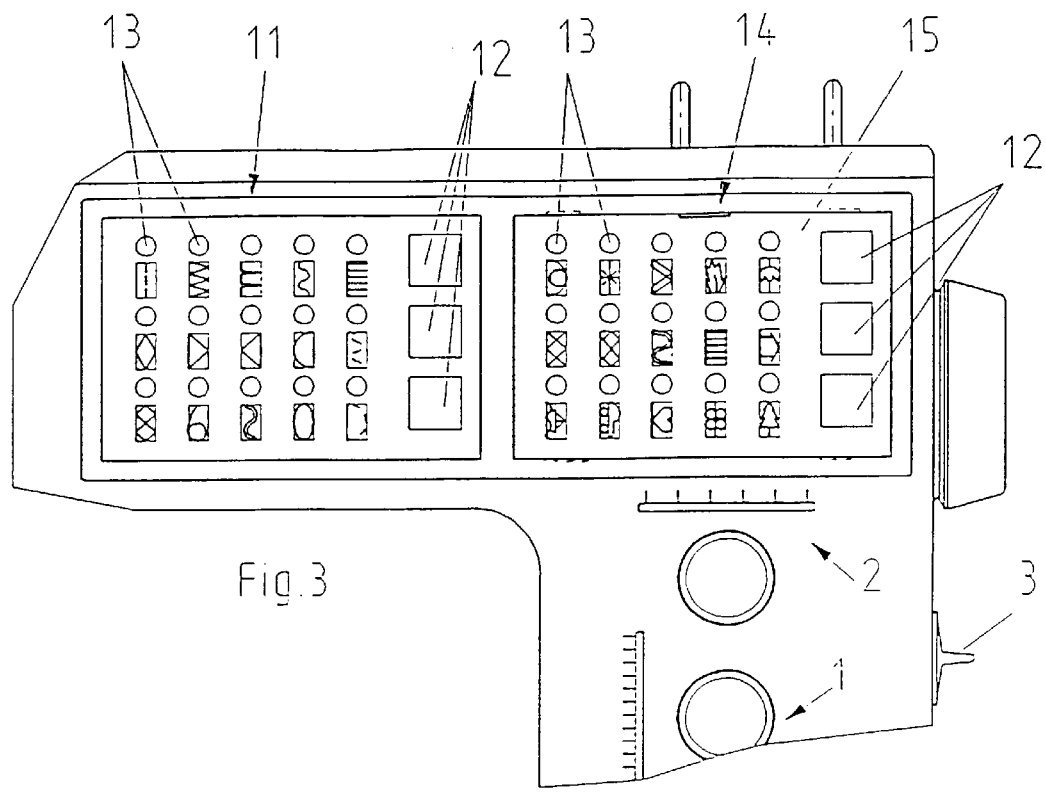
FIG. 3 shows an enlarged portion of FIG. 2.
Figure 4:
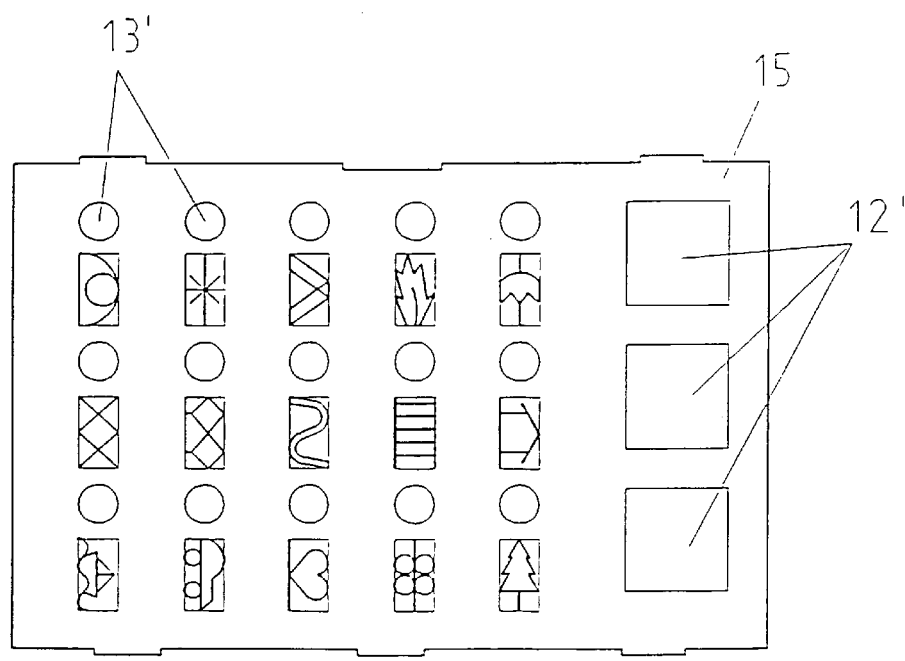
FIG. 4 shows a stitch pattern chart for the use on the right-hand portion of the selecting and display surface of the machine according to FIG. 3.

FIG. 2 shows a somewhat simpler sewing machine. Corresponding parts bear the same reference number as those in FIG. 1 For the input of stitch and stitch pattern data, only connector 9 for a data key is provided. The display is divided into the left-hand display field 11 on which the fixedly programmed stitch types and stitch patterns are shown. The individual stitch types or stitch patterns can be sequentially selected, for example by keys 12, and the selected stitch type or the selected stitch pattern is highlighted by light emitting diodes 13. The right-hand field 14 is arranged for selecting and displaying the individually programmed stitch patterns which may also be selected by means of keys 12 and displayed by LEDs 13. The display of the stitch patterns on the field 14 of the machine is preferably effected by means of a stitch pattern chart 15 that is represented in FIGS. 3 and 4 in an enlarged scale. This stitch pattern chart can be removably fastened in a predetermined position to the sewing machine, namely in such a manner that openings 13' are superimposed on the LEDs 13 of the sewing machine, and windows 12' over the selection keys 12 of the sewing machine. Stitch patterns shown on the stitch pattern chart 15 can thus be selected and activated by pressing a key, and the selected stitch pattern is shown as selected by the corresponding light emitting diode.

Figure 6:
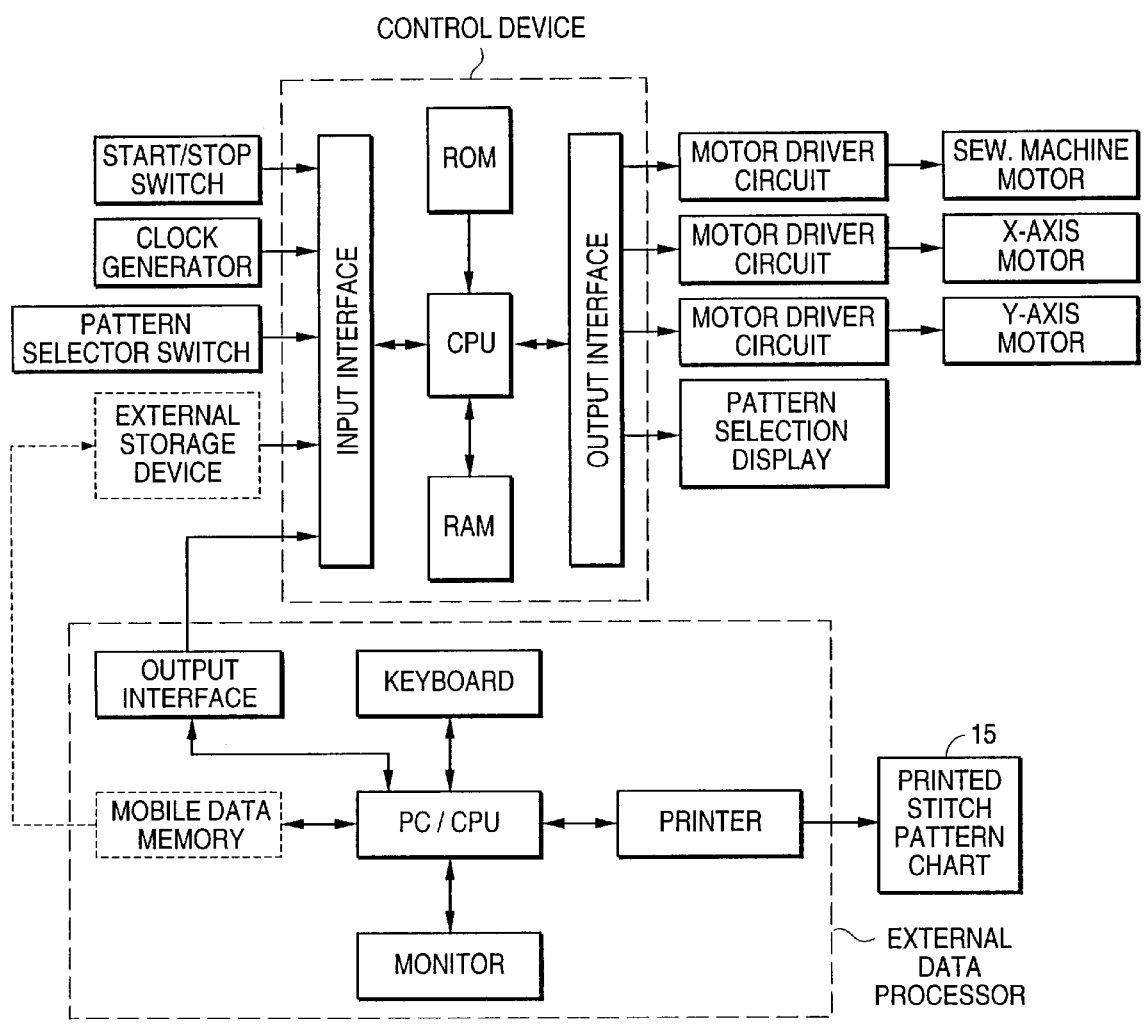
FIG. 6 shows a block diagram of the hardware configuration of a simpler equipped sewing machine according to FIG. 2 and of the associated external data processing unit.

FIG. 6 shows a block diagram similar to FIG. 5 of the electronic components of the sewing machine according to FIG. 2, and of an associated external data processing unit. The electronic equipment of the sewing machines essentially corresponds to that of FIG. 5 but some input and control possibilities are absent. Preferably, a PC having a printer associated thereto can also be used as an external data processing unit. In the manner already described, the desired additional stitch and stitch pattern data can be compiled on the PC and then transferred and stored in the changeable RAM of the sewing machine through the output interface. The input can be performed by an appropriate connector such as the connector 9 or another, capped interface (not represented). At the same time, the stitch pattern chart 15 is printed by means of these data, and the chart can be attached to the sewing machine. However, the compiled data can also be transferred by means of a mobile data storage device into the memory of the sewing machine if the machine is equipped with a corresponding reader. Such a mobile data storage device can also be ordered from a catalogue of sewing patterns and supplied by the manufacturer of the sewing machine together with the printed pattern chart, and the data can then be stored in the sewing machine.

Figure 7:
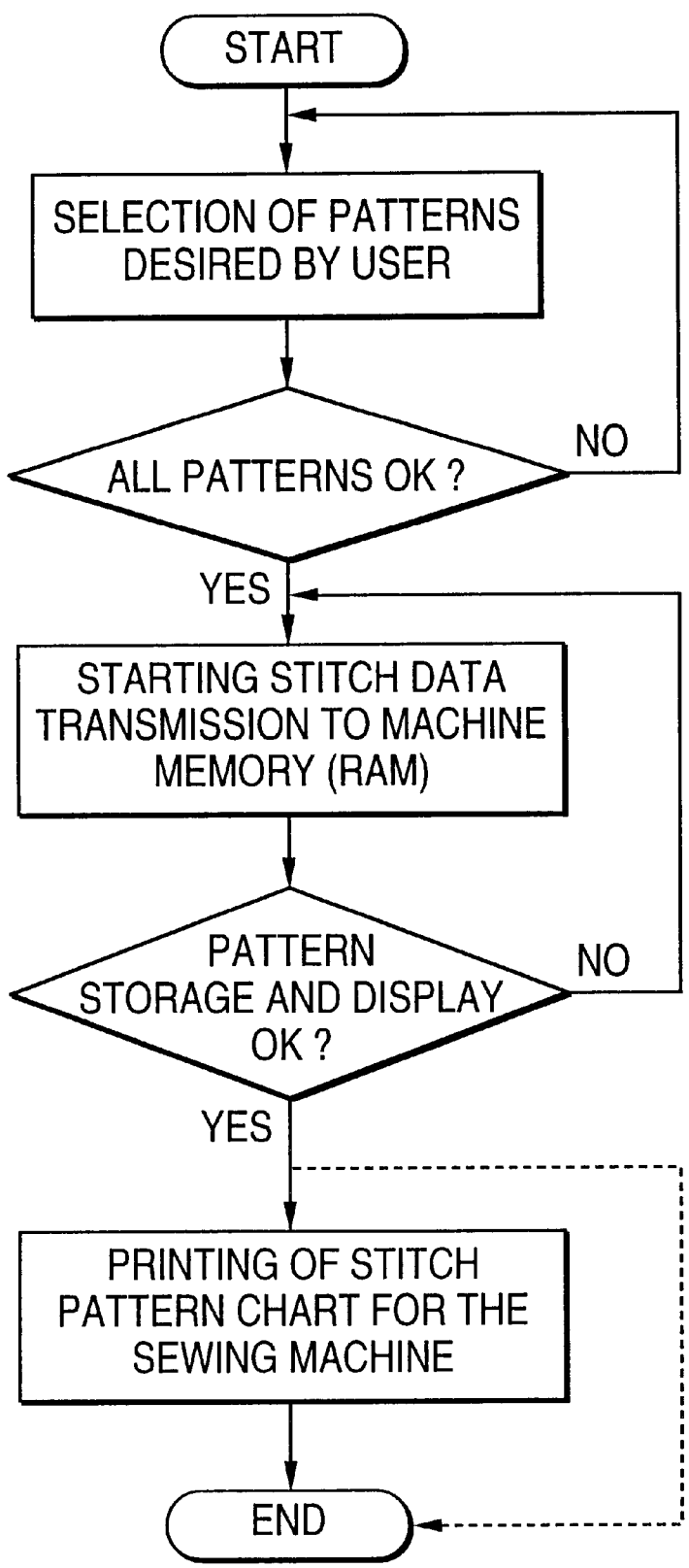
FIG. 7 shows a flow chart for illustrating the process steps.

FIG. 7 shows a flow chart for illustrating the steps of compiling stitch pattern data, their input into the changeable (floating) memory RAM of the sewing machine, and the printing of the stitch pattern chart.

The sewing machine according to FIG. 2 may also be designed in such a manner that all storage locations, in the present example 30 locations, are already filled with stitch and stitch pattern data during the manufacturing of the sewing machine. In this case, some data, namely half of the data in the present example, can be replaced afterwards by additional, individually selected data.

As it becomes obvious from the above description, a great number of execution variants are possible, starting from the simplest realization until the most complicated and sophisticated execution. In most cases, it will be sufficient to provide a capped or hidden interface at the sewing machine which is only accessible for the dealer or service personnel and through which the desired additional data are introduced into the machine for storing Stitch pattern charts for attaching to the sewing machine according to FIGS. 3 and 4 could also be assigned to connectable data carriers especially the data keys mentioned above. Different executions of such charts may facilitate the selection and assignment of the data.

We claim:

1. A process for organizing a data memory of an electronic sewing machine, comprising the steps of:

manufacturing the sewing machine with a data memory comprising storage locations wherein data of standard stitches and stitch patterns are stored;

leaving said data memory with a number of free storage locations for data of stitches and stitch patterns;

providing a collection of data corresponding to a plurality of stitches and stitch patterns and making said collection of data available to buyers and users of said sewing machine;

selecting data corresponding to an individual choice of stitches and stitch patterns from among said plurality of stitches and stitch patterns by the buyer or user of the sewing machine, whereby the selected data is a subset of said plurality of stitches and stitch patterns; and storing the selected data without further processing in said free storage locations of said memory, thereby providing a sewing machine with a data memory adapted to individual needs.

2. The process of claim 1, further comprising the steps of processing said selected data by means of a data processing unit and transferring said selected data into the memory of the sewing machine via an interface.

3. The process of claim 1, further comprising the step of printing a stitch or stitch pattern chart using said selected data.

4. The process of claim 1, further comprising the step of displaying the additional types of stitches or stitch patterns corresponding to said selected data on a stitch or stitch pattern monitor of the sewing machine.

5. The process of claim 1, further comprising the step of downloading said selected data from a data carrier or a data base of the manufacturer or another supplier, said selection of stitches and patterns being based on a display of the stitch types or the stitch patterns on a data processing installation linked to the sewing machine or on a display of the sewing machine.

6. The process of claim 1, further comprising the step of displaying the additional types of stitches or stitch patterns corresponding to said selected data on a stitch or stitch pattern chart fastened to the sewing machine.

7. A system comprising;

an electronic sewing machine having a memory with storage locations wherein data for standard stitches and stitch patterns are stored and with a number of free storage locations for data of stitches and stitch patterns;

a collection of data corresponding to a plurality of stitches and stitch patterns; and means for digitally reading selected data corresponding to a subset of stitches and stitch patterns from said collection of data and for introducing such selected data without further processing into said free storage locations of said memory, thereby providing said memory of said sewing machine with data of standard stitches and data of a number of individually selected stitches or stitch patterns, said sewing machine having selecting means for selecting a stitch or stitch patterns stored in said memory, and display means for displaying all memorized stitches and stitch patterns.

8. The system of claim 7, wherein the memory contains ROM storage locations that are occupied by durably stored data, and the memory contains additional storage locations adapted to receive additional data for storage or to modify already stored data.

9. The system of claim 7, wherein display locations are allocated to all memory locations selecting elements are provided for selecting predetermined stitch types or stitch patterns, and means are provided that control the allocation of display locations when additional data are being stored.

10. The system of claim 7, further comprising a support means for attaching a stitch or stitch pattern chart comprising display locations allocated to said selected data.

11. The system of claim 10, wherein the stitch or stitch pattern chart comprises openings through which luminous indicators and selecting elements of the sewing machine are visible or accessible, respectively.

12. The system of claim 7, further comprising a reading unit for data carriers bearing said selected data.

13. The system of claim 7, further comprising a connector on said sewing machine for an input unit for introducing said selected data into said sewing machine, and means for storing additional data of pictorial representations of stitch patterns corresponding to said selected data.

14. A method for providing an electronic sewing machine with a configured electronic data memory, comprising the steps of:

manufacturing the sewing machine with a data memory comprising ROM storage locations wherein data for standard stitches and stitch patterns are stored;

leaving said data memory with a number of free RAM storage locations for data of stitches and stitch patterns;

providing a collection Of data relating to stitches and stitch patterns and submitting said collection of data to a potential buyer or a user of the sewing machine;

selecting an individual choice of stitches and stitch patterns from said collection of data by the buyer or the user;

storing the selected individual choice into said free storage locations in said data memory, without further processing, by a manufacturer or retailer of the sewing machine to complete the sewing machine: and delivering the completed sewing machine to the buyer or the user with a complete memory comprising data for stitches and stitch patterns according to the selected individual choice of the buyer or the user.

15. A method according to claim 14, wherein a stitch or stitch pattern chart is printed showing a plurality of stitches and stitch patterns of the data stored in the data memory, said chart being delivered to the buyer or user together with the completed sewing machine.

16. A method for providing an electronic sewing machine with an electronic data memory, comprising the steps of:

manufacturing the sewing machine with a data memory comprising ROM storage locations wherein data for standard stitches and stitch patterns are stored;

leaving said data memory with a number of RAM free storage locations for data of stitches and stitch patterns;

providing a collection of data of stitches and stitch patterns and submitting said collection of data to a potential buyer or a user of the sewing machine;

selecting an individual choice of stitches and stitch patterns from said collection of data by the buyer or the user;

storing the selected data into the free storage locations of said data memory without further processing, to complete the sawing machine;

delivering the completed sewing machine having a complete memory comprising data for both standard stitches and stitch patterns and selected data corresponding to the individual choice of stitches; and printing a stitch or stitch pattern chart showing stitches and stitch patterns of which data are stored in said data memory, said chart being used together with the completed sewing machine.

17. A method according to claim 16, wherein said chart is attached to said sewing machine.

* * * * *